United States Patent [19]

Yamada

[11] Patent Number: 4,671,133
[45] Date of Patent: Jun. 9, 1987

[54] PARKING LOCK SYSTEM FOR A VEHICLE

[75] Inventor: Kenichi Yamada, Mitaka, Japan

[73] Assignee: Fuji Jukogyo Kabushiki Kaisha, Tokyo, Japan

[21] Appl. No.: 670,095

[22] Filed: Nov. 13, 1984

[30] Foreign Application Priority Data

Nov. 29, 1983 [JP] Japan ................... 58-225127

[51] Int. Cl.⁴ .................. G05G 5/06; B60T 1/00; B60T 1/06
[52] U.S. Cl. ........................... 74/530; 74/577 S; 188/31; 188/69; 192/4 A
[58] Field of Search ............... 192/4 A; 188/31, 69; 74/533, 534, 535, 530, 577 S

[56] References Cited

U.S. PATENT DOCUMENTS

| | | | |
|---|---|---|---|
| 2,379,829 | 7/1945 | Russell | 192/4 A X |
| 2,912,085 | 11/1959 | De Lorean | 192/4 A |
| 3,116,815 | 1/1964 | Chapman | 192/4 A X |
| 3,459,065 | 8/1969 | Fender | 74/530 |
| 3,703,941 | 11/1972 | Ohie et al. | 192/4 A X |
| 3,900,082 | 8/1975 | Sakamoto et al. | 188/69 |
| 3,952,838 | 4/1976 | Osten et al. | 192/4 A X |
| 4,200,002 | 4/1980 | Takahashi | 74/530 |
| 4,223,768 | 9/1980 | Iwanaga | 192/4 A |

FOREIGN PATENT DOCUMENTS

| | | | |
|---|---|---|---|
| 518988 | 11/1955 | Canada | 74/530 |
| 575626 | 4/1958 | Italy | 188/69 |
| 57-55246 | 2/1982 | Japan | 188/69 |
| 781218 | 8/1957 | United Kingdom | 74/530 |

Primary Examiner—Gary L. Smith
Assistant Examiner—Vinh Luong
Attorney, Agent, or Firm—Martin A. Farber

[57] ABSTRACT

A parking lock system for a vehicle having an automatic transmission, a cover being secured to a case of the automatic transmission. The system comprises a shaft bridging to the case and the cover, a parking pawl rotatably mounted on the shaft, a cam for rotating the parking pawl to engage it with a parking gear secured to an output shaft of the transmission, and a spring for biasing the parking pawl to disengage it from the parking gear. A guide plate is engaged with the shaft at an end thereof and engaged with the case of the transmission at the other end. The spring is so arranged to bias the parking pawl toward a stopper of the guide plate to hold the parking pawl in disengagement from the parking gear.

7 Claims, 5 Drawing Figures

PARKING LOCK SYSTEM FOR A VEHICLE

BACKGROUND OF THE INVENTION

The present invention relates to improvement of a parking lock system for a vehicle having an automatic transmission.

When a vehicle with an automatic transmission is parked on a slope, it is necessary to lock the output shaft of the transmission because the transmission has been disengaged from the output shaft of an engine.

In order to lock the output shaft of the transmission, a parking gear is provided on the output shaft of the automatic transmission, and is put into engagement with a parking pawl to lock the shaft during parking, so that rotation of the output shaft is prevented. Japanese Patent Laid-open No. 55-164527 has already disclosed such a construction comprising a parking gear and a parking pawl engaged with each other by means of a cam provided on a parking rod during parking of a vehicle, and disengaged while the vehicle is being driven using a return spring to retract the cam to release the pawl from the gear.

The conventional parking lock mechanism is usually assembled by attaching a cover, which contains a lock system comprising a parking pawl, a return spring, and other parts, to the transmission case. However, the assembling of the cover to the transmission case, with each part in its position on the inside of the cover is difficult, because the return spring always biases the parking pawl out of position. A conventional parking lock mechanism is shown in FIGS. 3 to 5.

As shown in FIGS. 3 to 5, an automatic transmission case 1 is provided with a cover 2 thereon which covers a parking gear 4 mounted on an output shaft 4a at an open side of the case 1. A shaft 6 bridges the space between the case 1 and the cover 2 and pivotally supports a parking pawl 3. When the vehicle is parked, a parking rod 7 is shifted from the position shown by the chain line to the solid line position, bringing a parking cam 7a secured to the rod 7 between a support plate 10 and the pawl 3 so that the pawl 3 is rotated by the cam 7a to engage with the gear 4, arresting the rotation of the output shaft 4a of the transmission. When starting of the vehicle, the parking cam 7a is retracted from the pawl 3 to remove it from the gear 4 by means of the force of a return spring 5. This spring 5 is engaged at one end on a projection 1c of the case 1, and at the other end on a side face of the parking pawl 3, and biases the pawl 3 away from the gear 4.

In this construction, it takes a long time to assemble the parking lock system because the shaft 6 tends to fall and come out of place by the force of the spring, and hence the parking pawl 3 must be held in place against the action of the spring 5.

SUMMARY OF THE INVENTION

It is the object of the present invention to improve the conventional parking lock system so it can be easily assembled and therefore to solve the problems of the conventional parking lock system.

According to the present invention, there is provided a parking lock system for a vehicle of the type having an automatic transmission, a cover secured to a case of the automatic transmission, a shaft bridging to the case and the cover, a parking pawl rotatably mounted on the shaft, a cam for rotating the parking pawl to engage it with a parking gear secured to an output shaft of the transmission, and a spring for biasing the parking pawl to disengage it from the parking gear.

The system comprises a guide plate engaged with the shaft at an end thereof and engaged with the case of the transmission at the other end, the guide plate being provided with a stopper.

The spring is so arranged to bias the parking pawl to the stopper of the guide plate to hold the parking pawl in disengagement with the parking gear.

In another aspect of the present invention, the guide plate is rotatably mounted on the shaft, and the other end of the guide plate is engaged with a recess provided in the case. The cam is provided on a parking rod which is axially moved to engage the parking pawl with the parking gear, and a guide groove is formed in the guide plate so as to guide the parking rod.

The other objects and features of this invention will be apparently understood from the following description with reference to the accompanying drawings.

DETAILED DESCRIPTION OF THE PREFERRED EMBODIMENT

Figure 1:
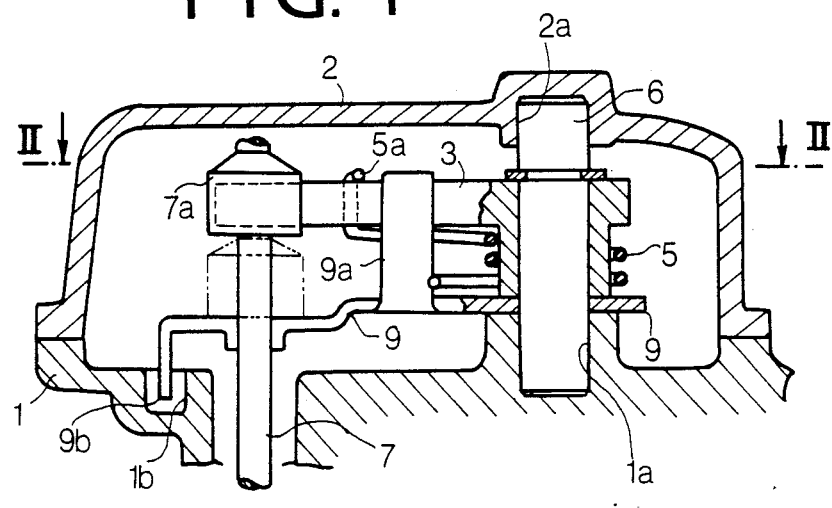
FIG. 1 is a sectional view showing an embodiment of a parking lock system according to the present invention.
Figure 2:
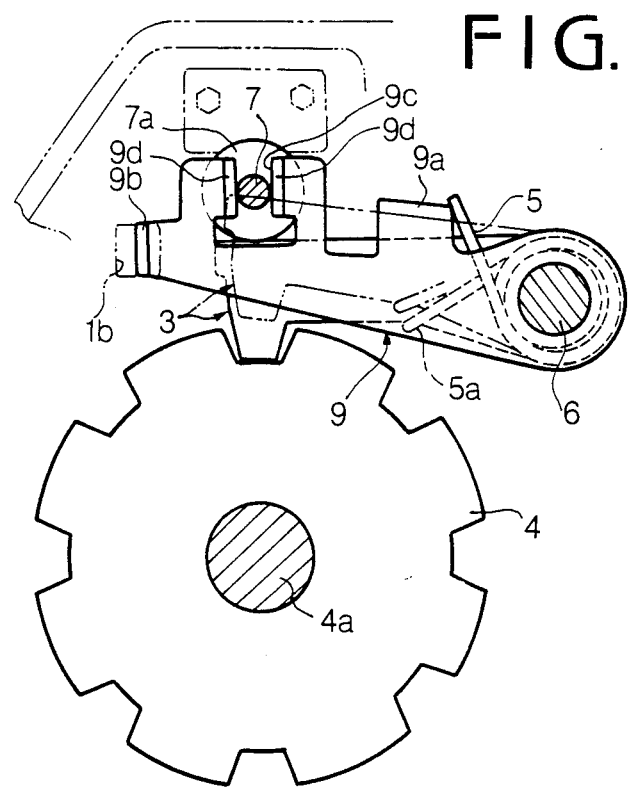
FIG. 2 is a sectional view taken along the line II—II of FIG. 1 a cover of which is being taken away.
Figure 3:
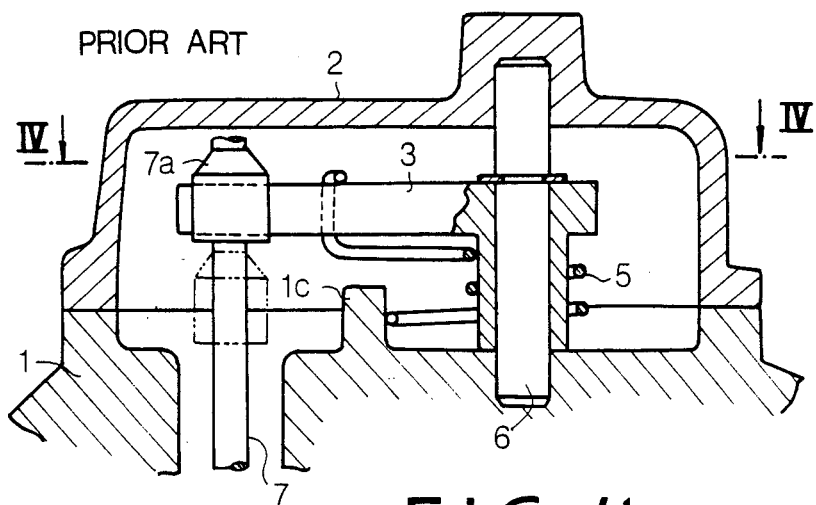
FIG. 3 is a view similar to FIG. 1, but showing a conventional system.
Figure 4:
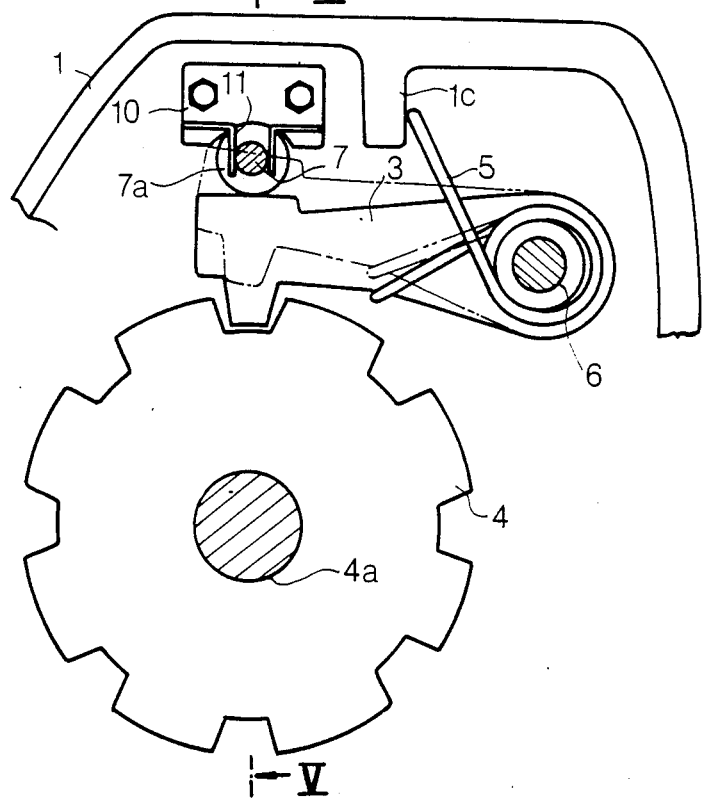
FIG. 4 is a sectional view taken along the line IV—IV of FIG. 3.
Figure 5:
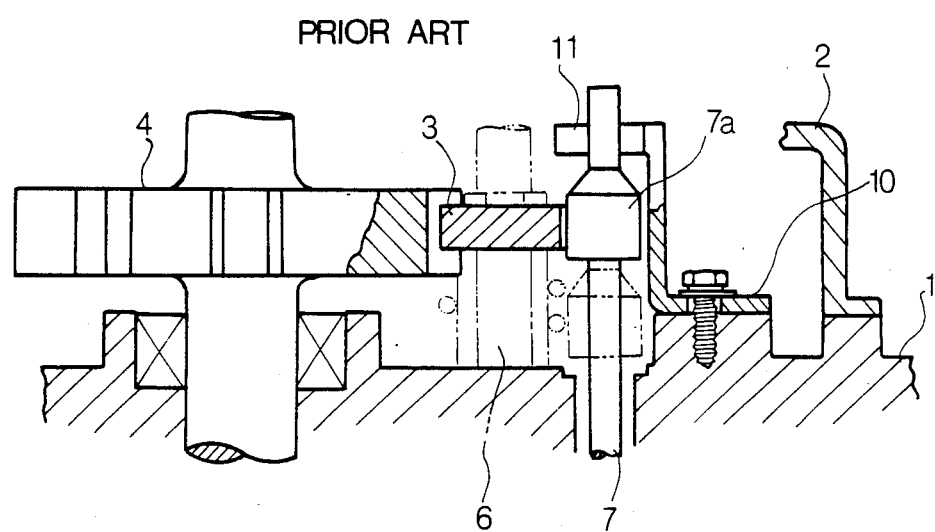
FIG. 5 is a sectional view taken along the line V—V of FIG. 4.

Referring to FIGS. 1 and 2, the same parts as the conventional system of FIGS. 3 to 5 are identified by the same reference numerals as FIGS. 3 to 5. The parking gear 4 which is exposed exposing through the open part of the case 1 is fixed to the output shaft 4a, similar to the conventional system. While the vehicle is parked, the parking pawl 3 is engaged with the parking gear 4, so that wheels of the vehicle which are in connection with the output shaft of the transmission are prevented from rotating even on a slope.

The parking pawl 3 is pivotally mounted on the shaft 6, one end of which is received in a bearing aperture 2a formed in the cover 2, and the other end in another bearing aperture 1a of the case. The return spring 5 is also provided on the shaft 6 to disengage the parking pawl 3 from the gear 4.

When parking the vehicle, the cam 7a secured to the parking rod 7 is shifted to the solid line position in FIG. 1 to rotate the pawl 3 into engagement with the gear 4, while, when starting the vehicle, the parking rod 7 is retracted to disengage the pawl 3 from the gear 4.

In accordance with the present invention, a guide plate 9 is rotatably mounted on the shaft 6. The guide plate 9 has a stopper 9a projecting from a side thereof engaged with an end of the return spring 5 wound around the shaft 6; an engaging member 9b formed by bending the end part of the guide plate 9 is able to be received in a recess 1b of the case 1; and a pair of risers 9d projects from the side of the guide plate 9 to form a guide groove 9c to guide the parking rod 7. The other end of the return spring 5 forms a hook 5a which engages with a side of the parking pawl 3. Thus, the other side of the pawl 3 is abuts against the inner side of the stopper 9a by the spring 5 in the disengaging position of the pawl shown by chain line in FIG. 2. In other words, the pawl 3 and the guide plate 9 mounted on the shaft 6 are engaged with each other by the spring 5, so that the spring 5 does not act on the shaft. In order to assemble the system, the parking pawl 3, the return spring 5 and the guide plate 9 are mounted on the shaft 6 as a structural unit. One end 5a of the spring 5 is engaged with a side of the parking pawl 3 and the other end with a side of the stopper 9a of the guide plate 9. Then, an end of the shaft 6 is secured in the bearing aperture 2a of the cover 2, and the other end of the shaft 6 is engaged with the bearing aperture 1a and the engaging member 9b formed at the end of the guide plate 9 is inserted in the engaging recess 1b provided on the case 1. Thus the cover 2 is mounted on the case 1 together with the park lock mechanism.

In the construction of the embodiment, the parking rod 7 is guided by the guide groove 9c formed on the guide plate 9, which makes the assembly much easier than assembly of the conventional system in which the parking rod 7 is supported by guide plates 11 provided on a supporting plate 10 in FIG. 4.

According to the present invention as described and illustrated by example, the cover 2 and the case 1 can be simply and easily assembled, because the parking pawl 3 and the return spring 5 can be preassembled in the cover 2 and can be kept in place without biasing the shaft 6.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a parking lock system for a vehicle having an automatic transmission, the system having a cover secured to a case of the automatic transmission, a shaft mounted on the case and the cover, a parking pawl rotatably mounted on the shaft, a cam for rotating the parking pawl to engage the latter with a parking gear secured to an output shaft of the transmission, and a spring for biasing the parking pawl to disengage the latter from the parking gear, the improvement comprising,
   a guide plate engaged with the shaft and engaged with the case of the transmission so as to keep the position thereof,
   the guide plate having a stopper,
   the spring being so arranged to bias the parking pawl against the stopper of the guide plate to hold the parking pawl in disengagement from the parking gear,
   a parking rod which is axially displaceably mounted,
   said cam is on said parking rod and engages the parking pawl with the parking gear when said parking rod is displaced, and
   said guide plate forms a guide groove, said parking rod is displaceably guidably mounted in said guide groove.

2. The parking lock system according to claim 1, wherein
   said spring is engaged against said pawl and said plate.

3. The parking lock system according to claim 1, wherein
   said spring has ends engaged against said pawl and against said stopper of said plate, respectfully.

4. The parking lock system according to claim 3, wherein
   said spring is a coil spring coiled around said pawl around a place of the rotatable mounting of said pawl on said shaft.

5. The parking lock system according to claim 1, wherein
   said plate is formed with a pair of risers projecting from a side of said plate forming said guide groove between said risers.

6. The parking lock system according to claim 1, wherein
   said stopper is formed on said guide plate on a side thereof away from said parking gear.

7. The parking lock system according to claim 1, wherein
   said spring is disposed between said pawl and said guide plate so as to yieldably press a side of said pawl against said stopper to hold the parking pawl in disengagement from the parking gear.

* * * * *